United States Patent [19]

Crawford et al.

[11] Patent Number: 4,803,872

[45] Date of Patent: Feb. 14, 1989

[54] PAPER PRINTABILITY TESTER

[75] Inventors: Steven M. Crawford; Eugene W. Crowder; Timothy H. Sparks, all of Covington, Va.

[73] Assignee: Westvaco Corporation, New York, N.Y.

[21] Appl. No.: 542,549

[22] Filed: Oct. 17, 1983

[51] Int. Cl.[4] ........................ G01L 5/00; G01M 19/00

[52] U.S. Cl. ..................................... 73/150 R; 73/159

[58] Field of Search ............. 73/159, 150 R; 101/349, 101/DIG. 6

[56] References Cited

U.S. PATENT DOCUMENTS

| | | | |
|---|---|---|---|
| 1,277,039 | 8/1918 | Braitmayer | 73/159 |
| 1,988,597 | 1/1935 | Karrer | 73/150 |
| 2,353,852 | 7/1944 | Rowland et al. | 73/159 |
| 2,728,224 | 12/1955 | Wheeler | 73/159 |
| 3,120,755 | 2/1963 | Walker | 73/150 R |
| 3,129,586 | 4/1964 | Allen et al. | 73/159 |
| 3,221,651 | 12/1965 | Tagliasacchi | 101/183 |
| 3,358,595 | 12/1967 | Lindemann | 101/183 |
| 3,413,848 | 12/1968 | Walker | 73/150 R |
| 3,760,720 | 9/1973 | Marshall et al. | 101/219 |
| 3,788,137 | 1/1974 | Lyon et al. | 73/159 |
| 3,869,984 | 3/1975 | Toth | 101/349 |
| 3,890,898 | 6/1975 | Fischer | 101/349 |

FOREIGN PATENT DOCUMENTS

| | | | |
|---|---|---|---|
| 2516863 | 5/1983 | France | 101/DIG. 6 |

*Primary Examiner*—William A. Cuchlinski, Jr.
*Assistant Examiner*—Thomas B. Will
*Attorney, Agent, or Firm*—W. A. Marcontell; R. L. Schmalz

[57] ABSTRACT

An apparatus is provided to integrate the steps of (1) distributing test ink to form a film of uniform thickness over the surface of a transfer roll; (2) transferring the ink film in a controlled number of revolutions at a controlled nip pressure onto an applicator roll; and, (3) further transferring the ink film in a controlled time interval to the surface of a test specimen at a controlled print pressure for a controlled number of print impressions.

8 Claims, 4 Drawing Sheets

PAPER PRINTABILITY TESTER

BACKGROUND OF THE INVENTION

1. Field of the Invention

The present invention relates to testing methods and apparatus. More particularly, the present invention relates to an apparatus for testing printing smoothness, ink absorbency and other characteristics of paper contributing to a mottled print appearance.

2. Background of the Invention

Numerous tests and testing devices have been devised by the prior art to prospectively evaluate the performance of a given lot of paper in a printing machine. Of these numerous devices and procedures, those provided by the Research Institute for the Printing and Allied Industries IGT have gained the widest acceptance by the printing industry. Such machines are generally characterized as IGT printability testers.

In essence, IGT printability testers are miniature printing machines having adjustment features for printing pressure and print speed. A paper sample (specimen) is mounted on a wheel sector for rotational nip contact with a print wheel. Rotational speed of the specimen sector is controllable as is the nip pressure between the specimen and the print wheel.

Ink film thickness on the print wheel is only indirectly controllable. The IGT printability tester print wheel is conveniently detachable from the tester unit for rotational mounting on a separate inking unit.

As a separate apparatus, the inking unit comprises two hard surfaced cylinders running on parallel axes bridged in driving nip contact by a resilient surface roller. One of the hard surface rollers axially reciprocates under rotation while the other is rotatively driven by a motor. The IGT printability tester print wheel is removed therefrom and rotatively secured to a swing bracket for rotative nip engagement with the resilient surface roller of the inking unit.

All mutually engaged rotating surface of the inking unit are of known surface area. When a known volume of ink is placed on the surface of one roller, the consequential film thickness may be calculated on the assumption that the ink has been uniformly distributed on all rotational surfaces. Such is the objective of the reciprocating roller to enhance the assumption of uniform distribution.

In operative test sequence, a printability tester print wheel is removed from the tester unit and positioned on the swing bracket of the inking unit to have a known ink film thickness applied to the surface thereof.

Having received such surface film, the print wheel is removed from the inking unit and returned to the printability test unit for specimen engagement.

In this test sequence, two extremely important parameters have been neglected by lack of control. First, there is no control over the nip pressure between the print wheel and the resilient ink transfer roller of the inking unit. This nip pressure influences the ink film thickness actually transferred to the print wheel surface.

More importantly, the time interval between print wheel coating on the IGT inking unit and specimen printing on the physically separated IGT printability tester is an uncontrolled variable due to the necessity to manually transfer the coated print wheel from the inking unit to the printability tester. Such time variations influence the tack of highly volatile solvent inks.

It is, therefore, an object of the present invention to provide a paper printability test unit wherein the nip pressure of the print wheel against an inking roller is precisely and repeatably regulated.

Another object of the present invention is to provide a paper printability testing unit wherein the inking and printing functions of a test sequence are integrated on a single frame.

Another object of the present invention is to provide a paper printability test unit having a precisely controlled time interval between inking and printing.

SUMMARY

These and other objects of the invention are accomplished by a set of ink distributing rollers and a specimen mounting wheel sector that are linked on the same frame structure by an applicator roll mechanism which includes a pair of swing arms for supporting rotational bearing pins of a resilient surface ink applicator roll. Arcuate movement of the swing arm mount is driven between position extremes by a linear motor for engaging the applicator roll with the transfer roll of the ink distribution set at one end of the arc. At the other end of the arc, the ink covered roll engages a specimen surface mounted to a controlled rotation sample sector.

Means are provided to regulate the magnitude of bearing force applied to the applicator roll at both ends of the arc. Time engagement of the applicator roll in nip engagement with the constant rotational speed ink transfer roll is also regulated. Upon completion of the designated ink film transfer period, the applicator roll is automatically carried by the swing arms over a fixed time interval into engagement with the rotating specimen for a designated number of specimen rotations. Rotational speed of the specimen is also regulated.

BRIEF DESCRIPTION OF THE DRAWINGS

Relative to the several figures of the drawings wherein like reference characters designate like or similar elements.

DESCRIPTION OF THE PREFERRED EMBODIMENT

Figure 1:
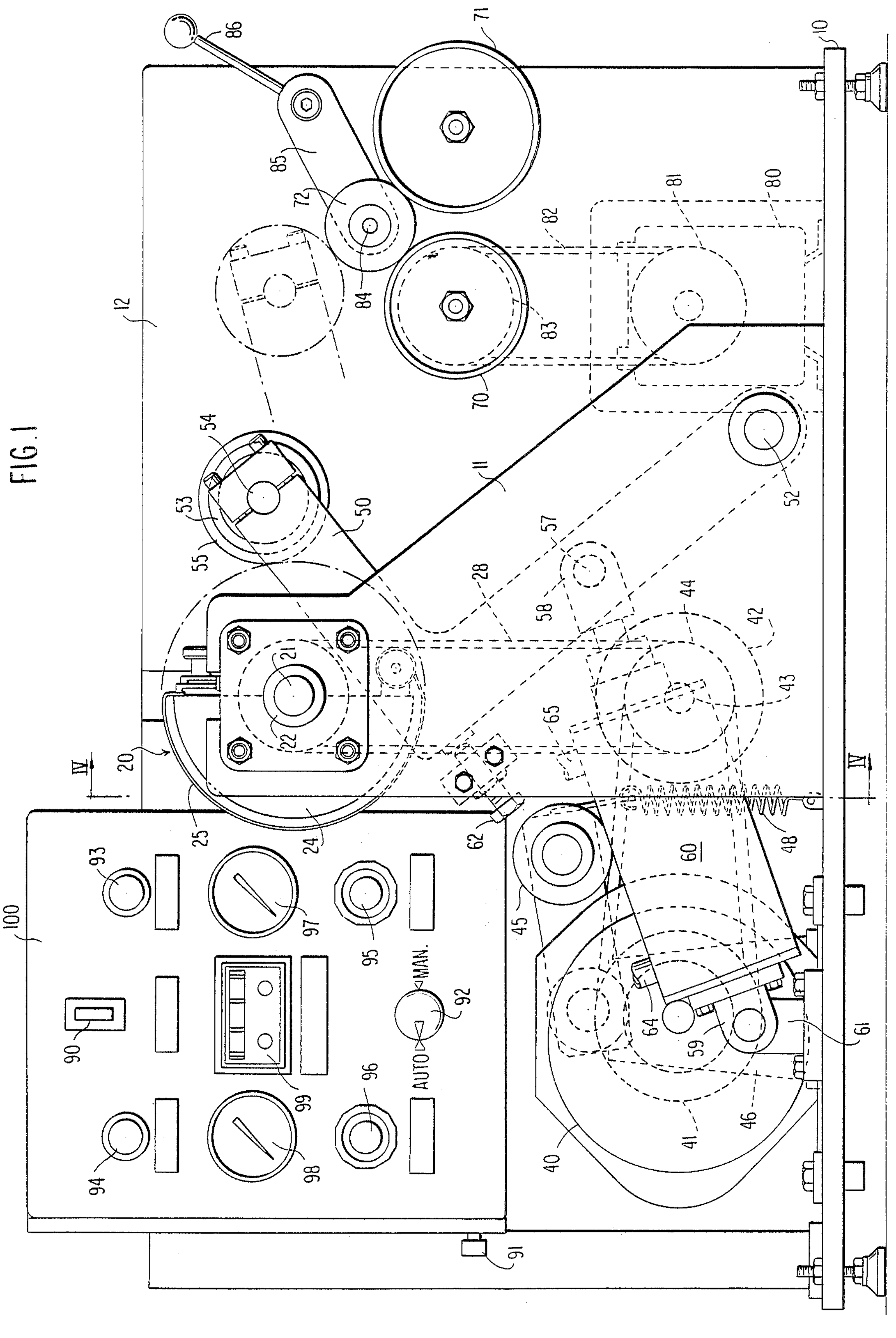
FIG. 1 is a front elevational view of the present invention.
Figure 2:
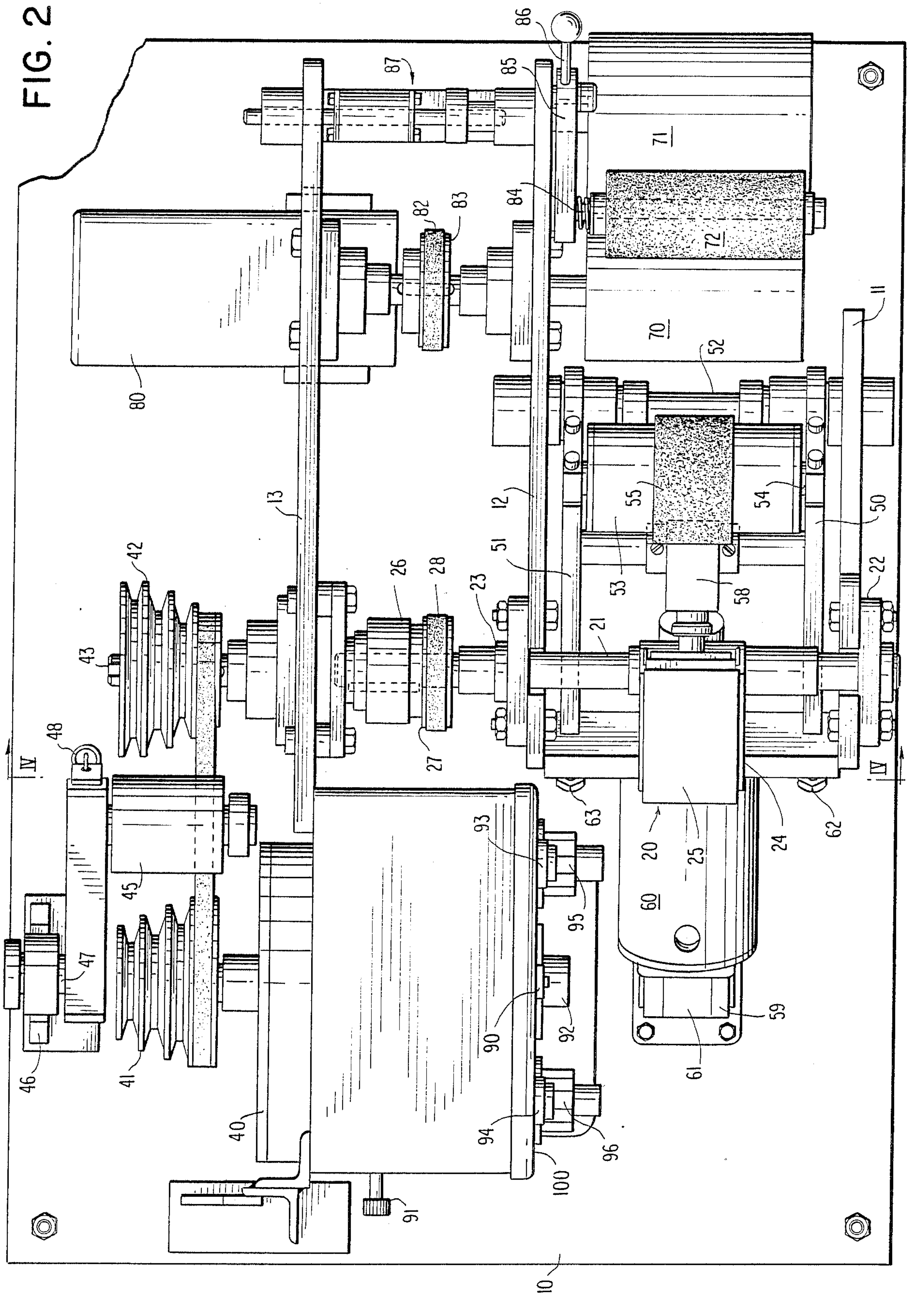
FIG. 2 is a top plan view of the invention.
Figure 3:
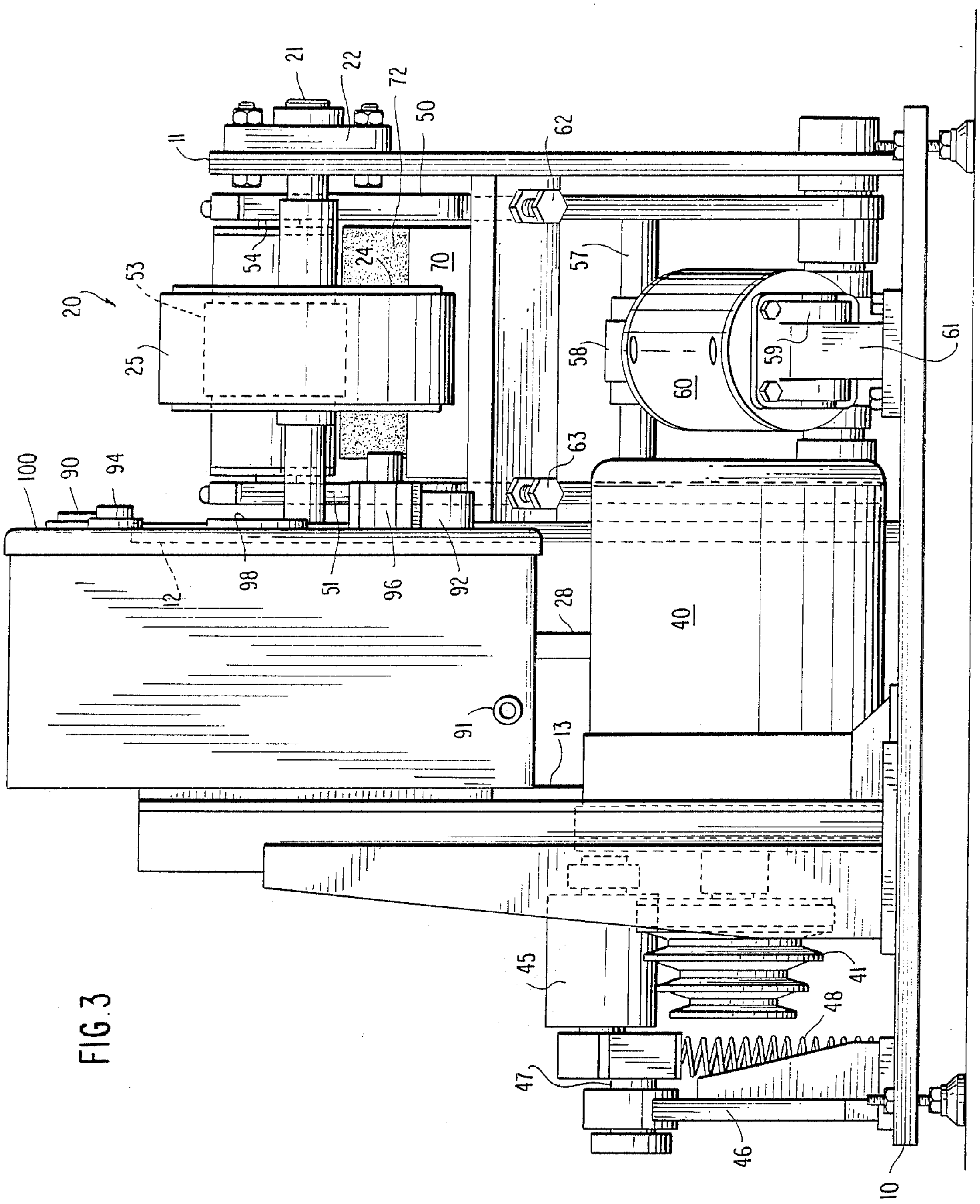
FIG. 3 is an end elevational view of the invention.
Figure 4:
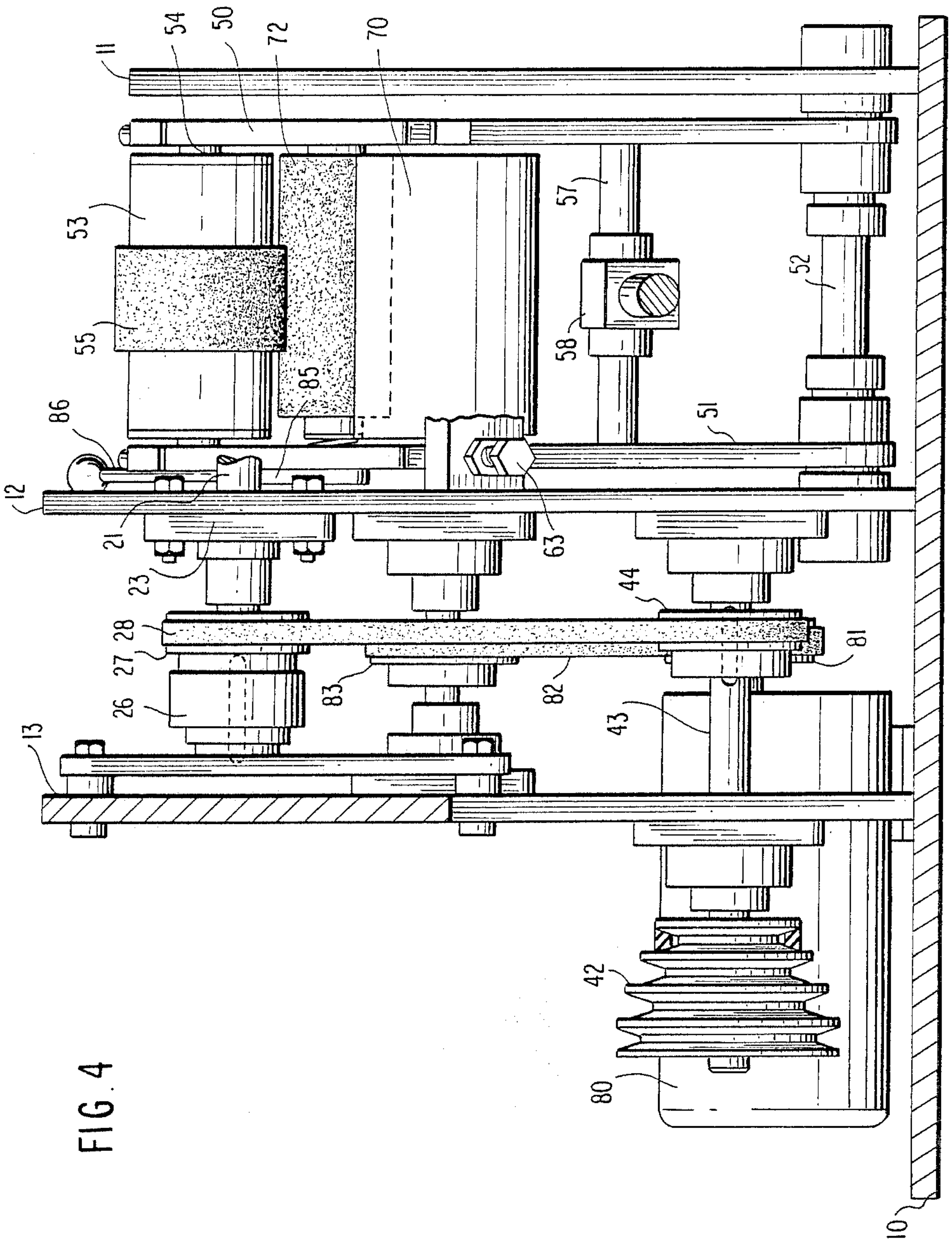
FIG. 4 is a sectional elevational view of the invention taken through cut lines IV—IV of FIGS. 1 and 2.

The paper printability tester of the present invention is constructed on a base plate 10 having three upstanding, parallel rib plates 11, 12 and 13 secured thereto.

The front rib plate 11 cooperates with the center rib plate 12 to support bearings for the sample roll sector 20 and applicator roll swing arms 50 and 51. Sample roll drive shaft 21, supported by bearings 22 and 23, has a chordal sector of a roll 24 rigidly secured thereto for conveniently mounting specimen strips of paper 25 to be tested. Electrically operated single revolution clutch 26 mounted on the back end of shaft 21 has an input belt sheave 27 for receipt of drive belt 28.

Power for the roll sector 20 is derived from electric motor 40 which directly drives a stepped-gang sheave 41. By connective v-belt, the gang sheave 41 drives a corresponding gang sheave 42 keyed to a jackshaft 43.

Jackshaft 43 is bearing mounted to center rib plate 12 and back rib plate 13 with the gang sheave 42 keyed to the cantilevered end of the jackshaft projecting behind the back rib plate 13 in drive alignment with the motor gang sheave 41.

Between the back and center rib plates 13 and 12, output drive sheave 44 is keyed to jackshaft 43 in drive alignment with the drive belt 28.

To secure adequate belt tension in the drive belt connecting gang sheaves 41 and 42, an idler roll 45 pivots about a pedestal 46 supported journal pin 47 into rolling engagement with the back side of the drive belt between sheaves 41 and 42. A tension spring 48 loads the engagement.

The applicator roll assembly comprises two, parallel bell cranks 50 and 51 pivoted about journal pin 52 that is mounted through front and center rib plates 11 and 12. Applicator roll 53 is positioned between the upper distal ends of bell cranks 50 and 51 pivoted about journal pin 52 that is mounted through front and center rib plates 11 and 12. Applicator roll 53 is positioned between the upper distal ends of bell cranks 50 and 51 for free rotation about an axle pin 54. About the central periphery of applicator roll 53 is bonded a resilient cover 55 of approximately 30 Durometer hardness.

Approximately midway along the bell crank legs, a strut pin 57 is provided to pivotally receive the eye of motor strut 58. The cylinder eye 59 of linear motor 60 is journal pinned to frame bracket 61. Adjustable limit stops 62 and 63 secured to front and center rib plates provide a structural limit surface for the bell cranks 50 and 51 to engage under draw-stroke load from the motor 60.

An integral inking roll assembly comprises a drive roll 70, reversing roll 71 and a transfer roll 72. All three rolls are cantilever mounted from the center rib plate 12 to facilitate cleaning and removal. Drive roll 70 and reversing roll 71 are normally of hard surface metallic materials such as steel or aluminum. Transfer roll 72 is provided with a resilient cover of approximately 30 Durometer hardness. Electric motor 80 rotates the drive roll 70 by means of belt 82 connected between sheaves 81 and 83.

The axle of rotation 84 for transfer roll 72 is cantilever mounted to the distal end of crank arm 85. Manual crank lever 86 is attached to the journal base of crank arm 85 to facilitate removal of the transfer roll 72 from its axle 84 for cleaning and replacement.

In addition to rotation about its axis, reversing roll 71 also axially reciprocates by means of a cylindrical cam mechanism 87. Such compound rotating-reciprocation facilitates rapid and uniform distribution of an ink film over the three roll surfaces of the distribution assembly.

The ink source is usually from a syringe or other measured dispenser for manually depositing a precise quantity onto the surface of transfer roll 72 while engaged with the drive roll 70.

Controls for the aforedescribed mechanisms are housed within panel 100 which includes a primary on/-off electrical power switch 90 and utility air inlet 91. For versatility, the system is provided with a circuit selector switch 92 for operator choice between a fully automatic mode of operation and a mode that permits manual timing respective to the applicator roll 53 inking cycle and the printing cycle. In the manual mode, each of these cycles is started independently by start switches 93 and 94, respectively.

When started by switch 93, a solenoid valve opens air service to a pressure regulator 95 which admits air at the pressure indicated by gauge 97 to the piston end of motor 60 via flexible conduit 64. This action extends the motor rod 58 to push the applicator roll 53 into engagement with the previously coated ink transfer roll 72 at a constant nip load that is proportional to the gauge 97 indicated pressure. Engagement time of the applicator roll with the transfer roll is dependent on a time delay relay not shown. Since the ink distribution system rotates at constant speed under the power of motor 80, the exact number of rotations that the applicator roll 53 is engaged with the transfer roll 72 is regulated by the adjustable time delay relay.

Upon completion of the prescribed time delay, the first solenoid valve is closed and a second solenoid valve opened to admit service air to the regulator 96 by which air pressure to the rod end of motor 60 is admitted via flexible conduit 65. Gauge 98 informs the operator of the applied pressure.

Pressure to the rod end of motor 60 draws the rod 58 to swing bell crank arms 50 and 51 into engagement with the limit stops 62 and 63. As bell crank arms 50 and 51 approach engagement with the limit stops 62 and 63, a momentary contact limit switch closes an electrical arming circuit for the counter relay 99 which controls power to the single revolution clutch 26.

Sample roll sector drive motor 40 is energized continuously through the primary switch 90 but the drive train is normally interrupted at the single revolution clutch 26. Upon signal command from the counter relay 99, clutch 26 will connect the jack shaft 43 with the sample roll sector drive shaft 21 for one revolution of the drive shaft. Depending on the count setting of counter relay 99, the cycle will automatically repeat until the predetermined revolution count is obtained.

Upon completion of the predetermined sample roll revolutions, the arming circuit for relay 99 is opened. The counter relay and clutch 26 cannot be operated again until the bell crank arm limit switch is again momentarily closed to actuate the arming circuit. This would not normally occur until the bell crank arms are again rotated to engage the applicator roll with the transfer roll for another inking cycle.

In the automatic operating mode, approach of the bell crank arms to the limit stops initiates the limit switch signal directly to the arming relay to start the print cycle automatically and without interruption. In the manual operating mode, however, the bell crank limit switch signal to the arming relay is interrupted. Consequently, the bell crank arms come to rest against the limit stops without further action by the sample roll sector. Initiation of such further action is controlled by the print cycle start switch 94 which provides the arming relay with the signal charge necessary to close the counting relay power circuit.

It has been noted that sample roll 24 is only a sector of a full cylinder. Consequently, limit stops 62 and 63 are set to position the periphery of applicator roll 53 for engagement with the specimen only upon rotation of the roll 24. During such rotational engagement, the nip load between the applicator roll 53 and the specimen 25 is dictated by the controlled pressure of regulator 96 as is reported by gauge 98.

The time interval required for swinging the bell crank arms 50 and 51 from one operative position to the other is determined by the volumetric size of linear motor 60 and the air flow rate through the respective supply conduits. Control may be asserted over these time intervals by the use of orifices or flow control valves in the conduits 64 and 65.

As the primary function of the present invention is to test paper for surface smoothness and ink absorbency, the test specimen should be of sufficient size for repetitive conclusions from what is an essentially subjective evaluation. We have found specimen dimensions of 2.25 inches wide and 14 inches long to satisfy this criteria.

Other specific operating conditions may include a motor 60 air pressure on the piston side of approximately 10 psi for transfer of ink film on the transfer roll 72 to the applicator roll 53. Approximately 20 psi has been used on the motor rod side to load the applicator roll against the specimen 25. The number of sample roll test revolutions is variable depending on the number of print stations in the press on which the paper is to be used. Due to characteristics of ink solvent volatility or rheology, printing difficulties with a particular paper may not become apparent until the web approaches the final print station.

Having fully described our invention, those of ordinary skill in the art will find adequate opportunity for construction and operating improvements.

As our invention, however, we claim:

1. An apparatus for testing the printability of paper comprising:

A. means for substantially uniformly distributing a measured quantity of ink to the rotating surfaces of a plurality of ink distributing cylinders;

B. means for rotating a specimen of paper about a fixed axis of revolution;

C. applicator roll means for transfer of an ink film from the surface of one of said ink distributing cylinders to the surface of said rotating specimen;

D. translational means comprising an articulated arm to support said applicator roll means at one end thereof for substantially free rotation about an axis of revolution and the other end pivotably secured about a fixed rotational axis for oscillatory movement between a first position of rolling nip engagement of said applicator roll with said one ink distributing cylinder and a second position of rolling nip engagement with said rotating specimen; and, E. reversible motor means for driving said translational means between said first and second positions, said motor means including pressure regulation means for selectively adjusting the pressure said applicator roll bears against said ink distributing cylinder in the first position and against the rotating specimen in the second position.

2. An apparatus as described by claim 1 wherein said means for rotating said specimen comprises a cylindrical sector having a partial circle periphery to which said specimen is secured for testing, the remaining peripherial elements of said sector being of less radial dimension from said fixed axis of revolution than said partial circle.

3. An apparatus as described by claim 2 wherein said fixed axis of rotation for said specimen comprises single-revolution clutch means for controlling rotational drive power to said cylindrical sector.

4. An apparatus as described by claim 3 wherein said reversible motor means comprises a double-acting piston and cylinder having fluid pressure regulators respective to opposite pressure faces of said piston.

5. An apparatus as described by claim 4 comprising supply fluid selection means for directing a source of pressurized fluid to a select pressure regulator.

6. An apparatus as described by claim 5 comprising timing means for operating said supply fluid selection means to direct pressurized fluid from a first pressure regulator to a second pressure regulator and return to the first pressure regulator over a selected time interval.

7. An apparatus as described by claim 6 comprising revolution control means for said single revolution clutch means to predetermine the number of rotating nip engagements said specimen will have with said applicator roll.

8. An apparatus as described by claim 7 comprising operating sequence control means for automatically sequencing said applicator roll from said second position to said first position and return to said second position over said selected time interval, and actuating said revolution control means upon return of said applicator roll to said second position.

* * * * *